O. A. HECKEL, C. M. KACHEL, W. F. GOESSLING & H. E. PAUK.
CLOTH MEASURING AND REWINDING MACHINE.
APPLICATION FILED DEC. 30, 1909.
1,074,621.
Patented Oct. 7, 1913.
13 SHEETS—SHEET 1.
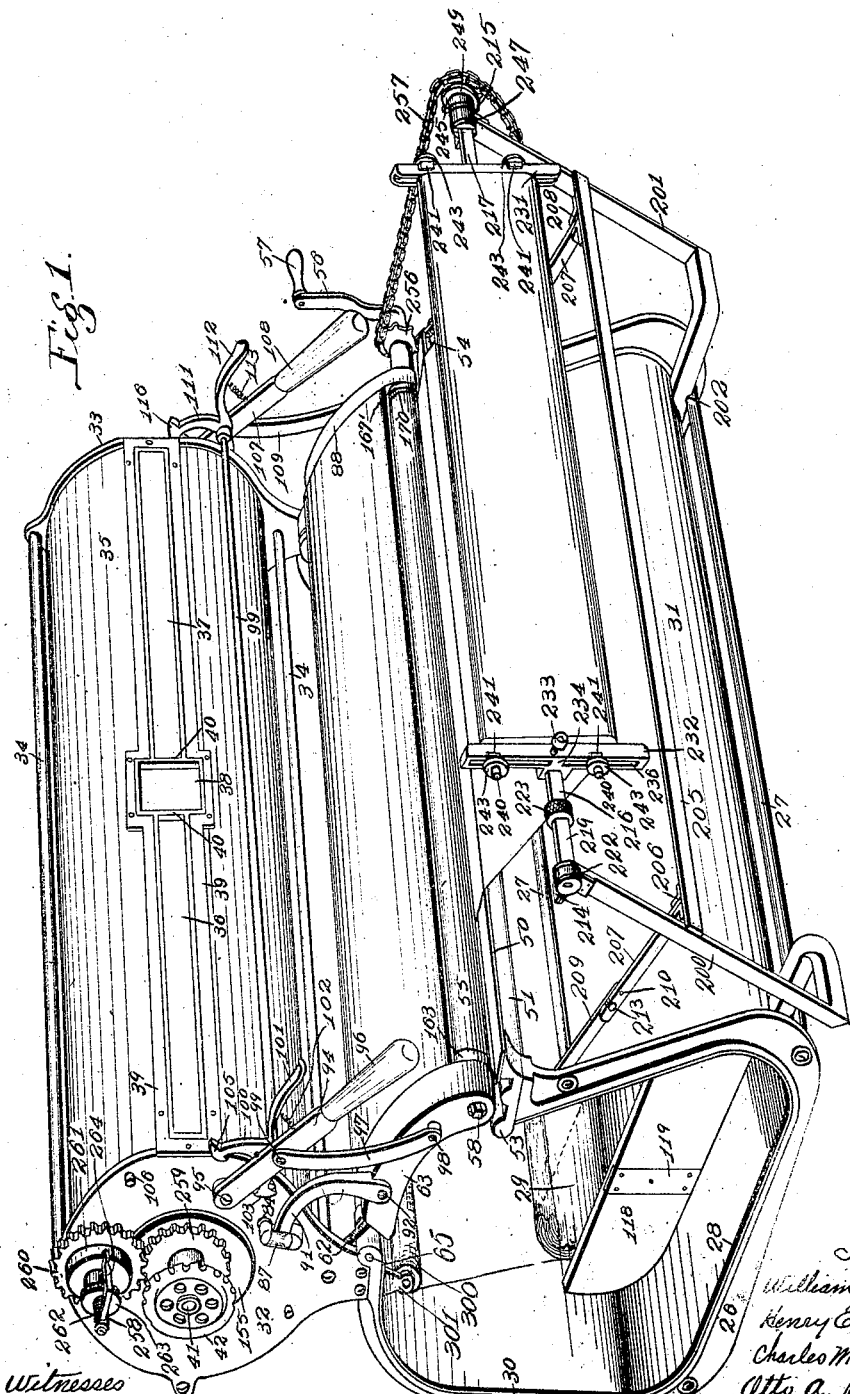

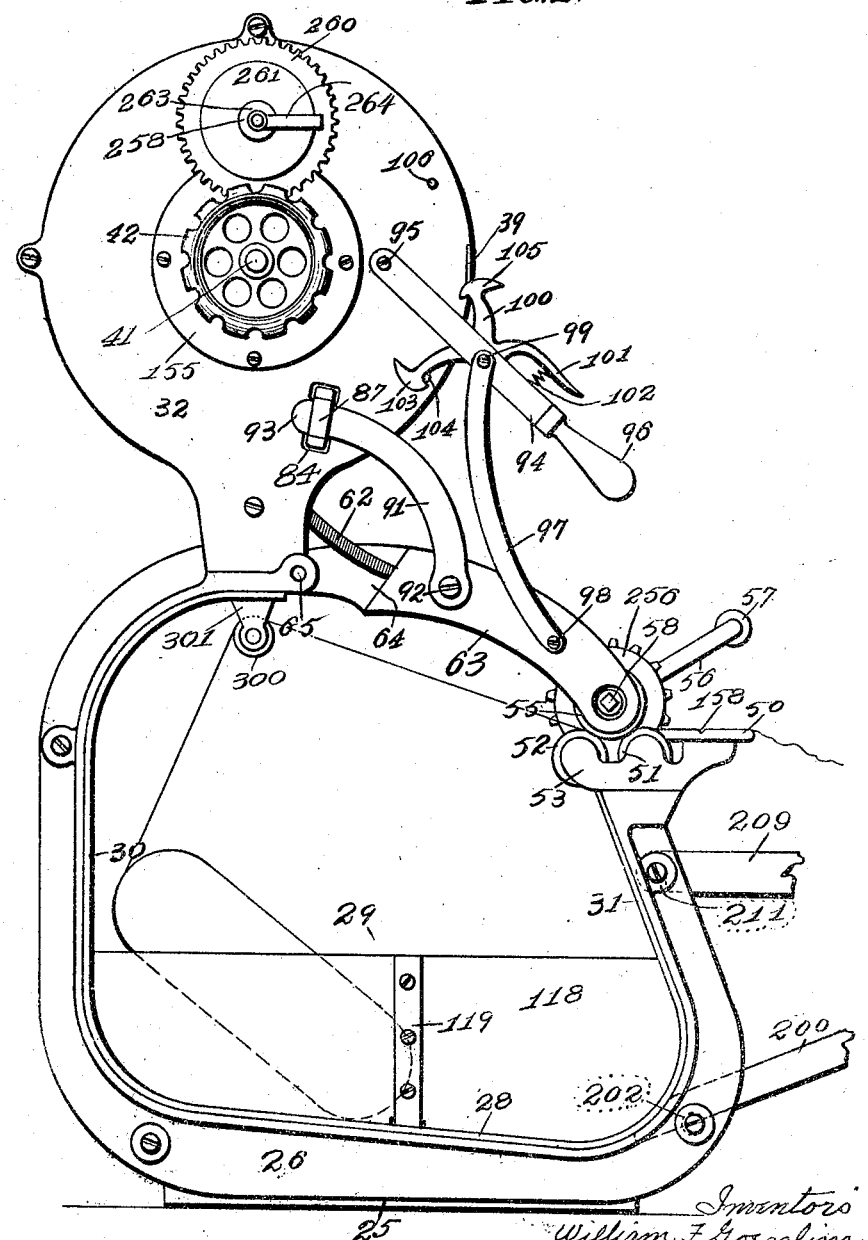

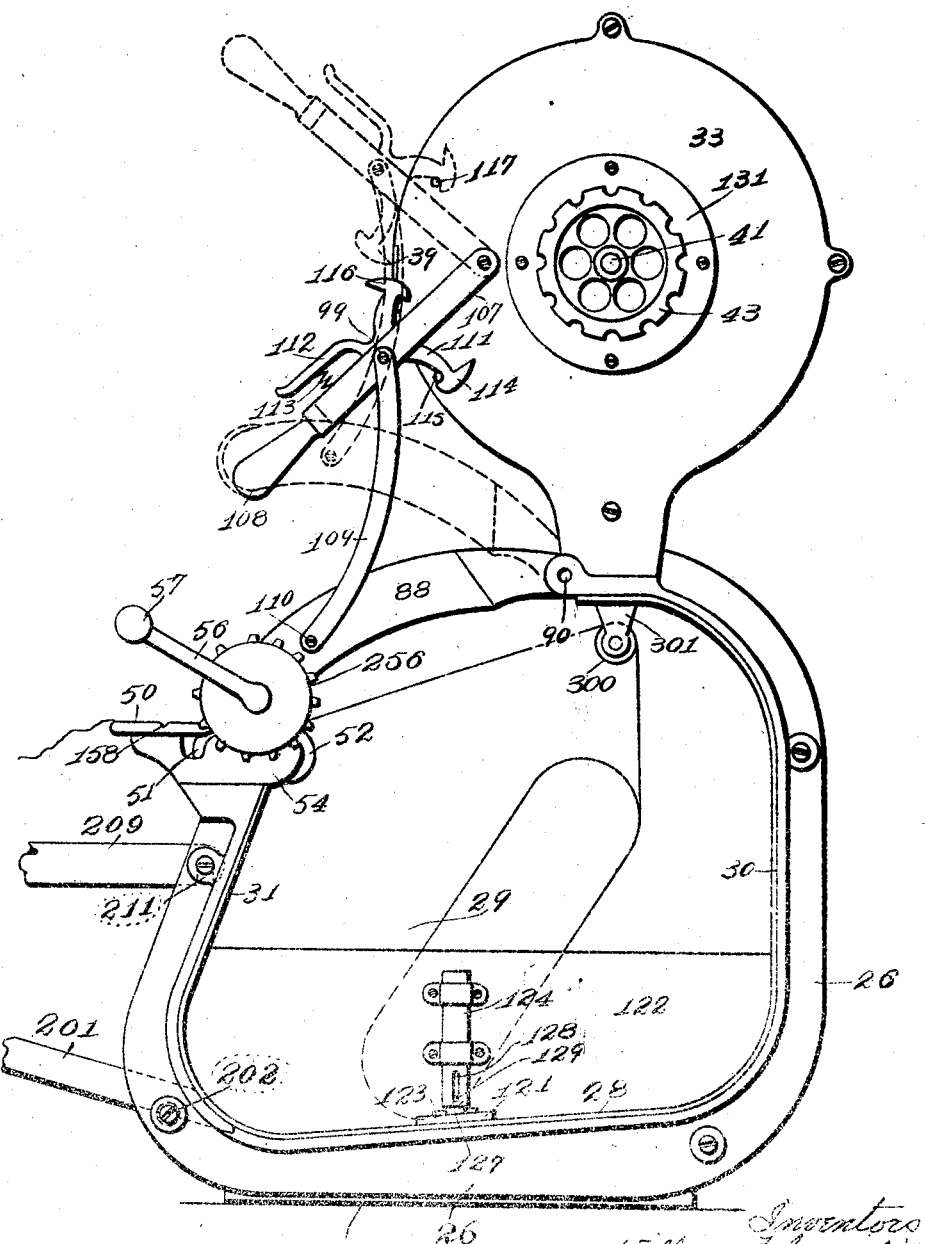

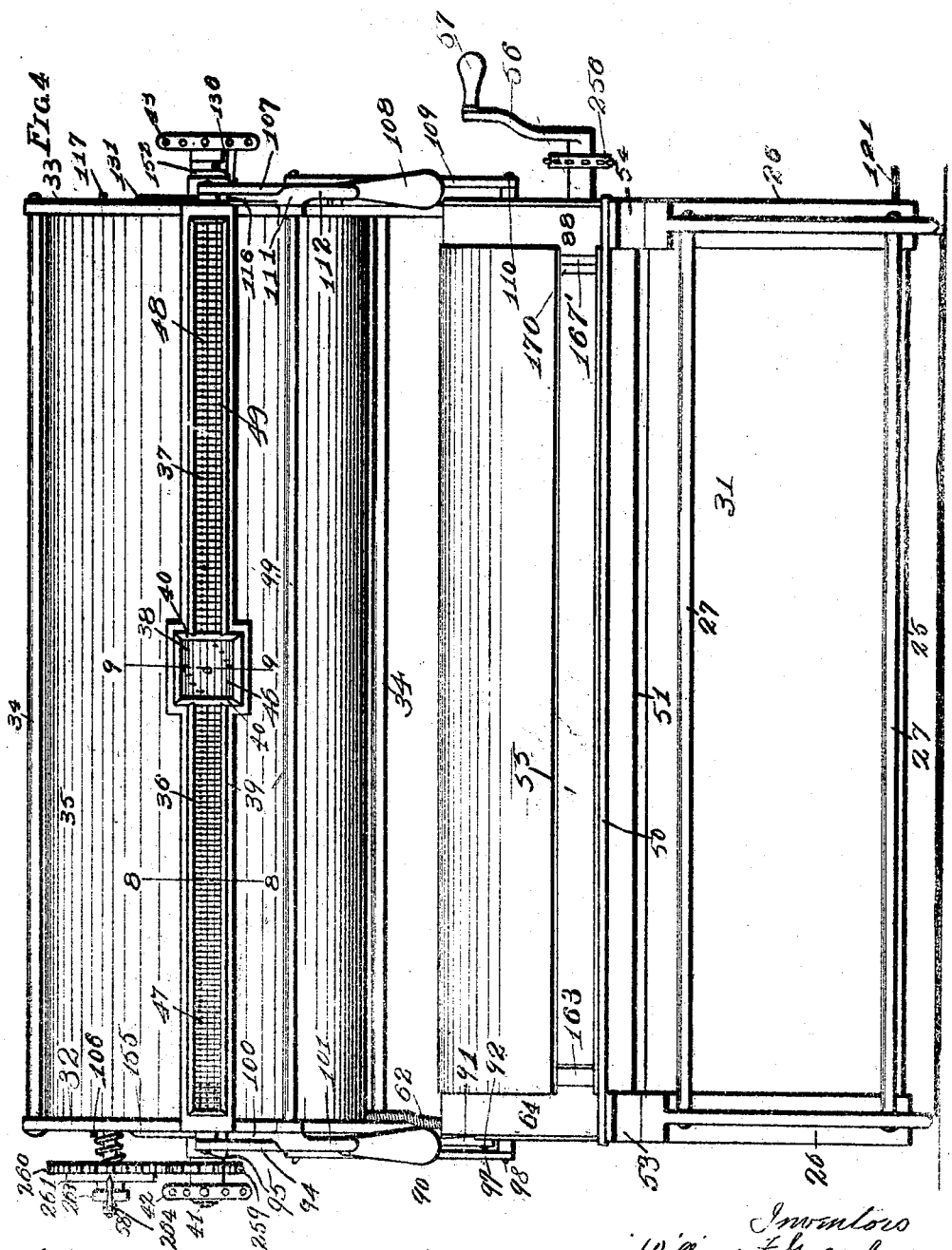

O. A. HECKEL, C. M. KACHEL, W. F. GOESSLING & H. E. PAUK.
CLOTH MEASURING AND REWINDING MACHINE.
APPLICATION FILED DEC. 30, 1909.
1,074,621.
Patented Oct. 7, 1913.
13 SHEETS—SHEET 5.
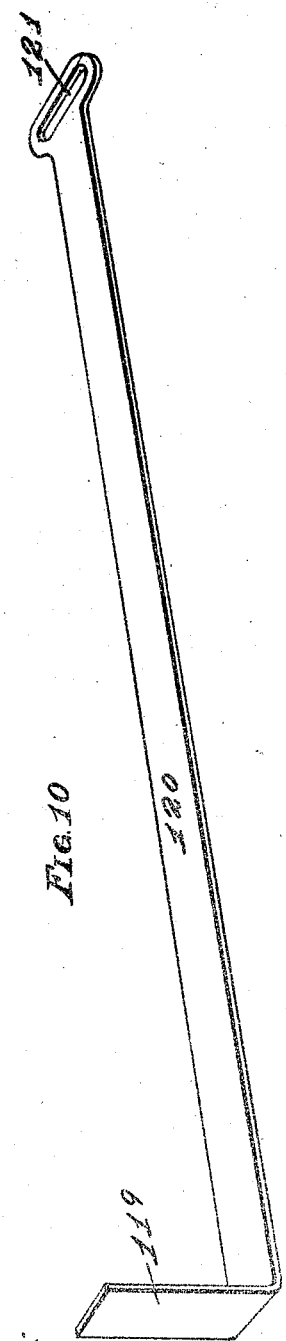
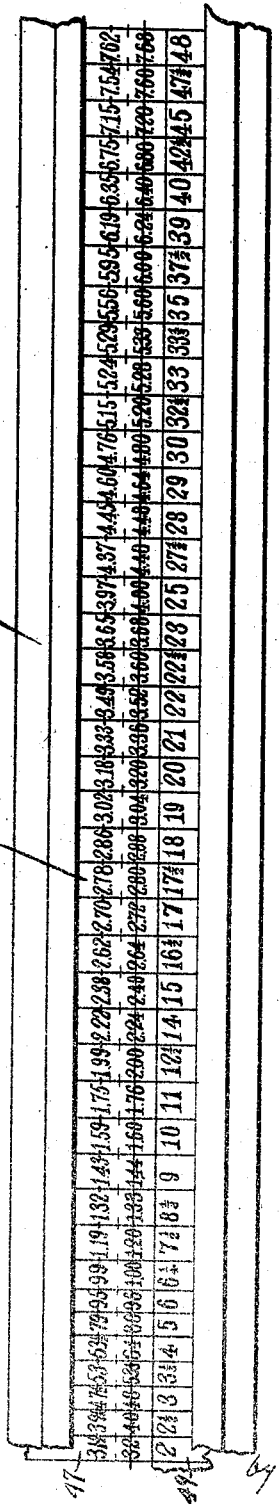

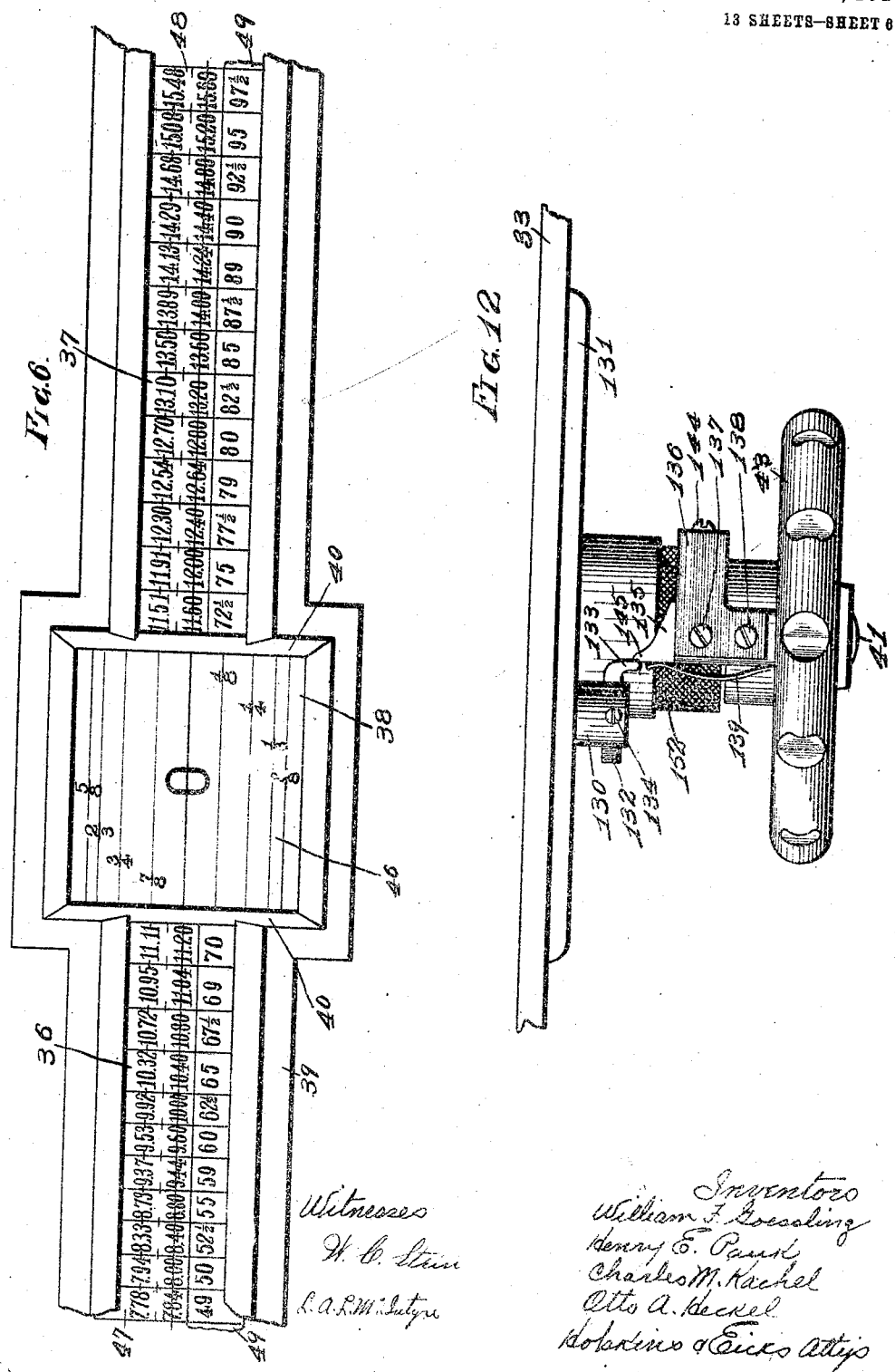

O. A. HECKEL, C. M. KACHEL, W. F. GOESSLING & H. E. PAUK.
CLOTH MEASURING AND REWINDING MACHINE.
APPLICATION FILED DEC. 30, 1909.
1,074,621.
Patented Oct. 7, 1913.
13 SHEETS—SHEET 7.
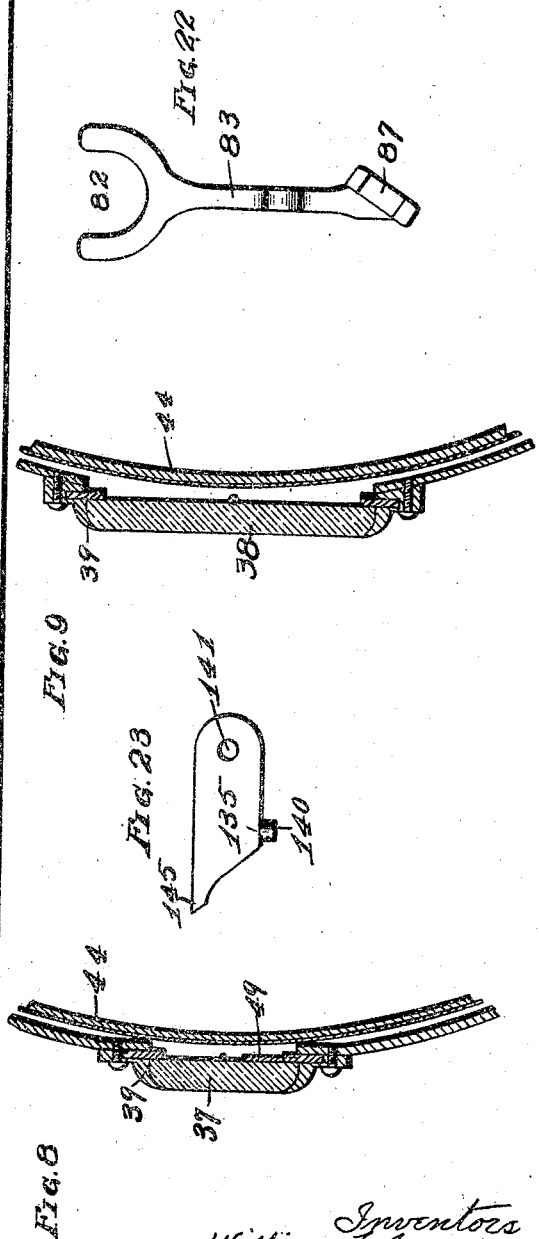

O. A. HECKEL, C. M. KACHEL, W. F. GOESSLING & H. E. PAUK.
CLOTH MEASURING AND REWINDING MACHINE.
APPLICATION FILED DEC. 30, 1909.
1,074,621.
Patented Oct. 7, 1913.
13 SHEETS—SHEET 8.
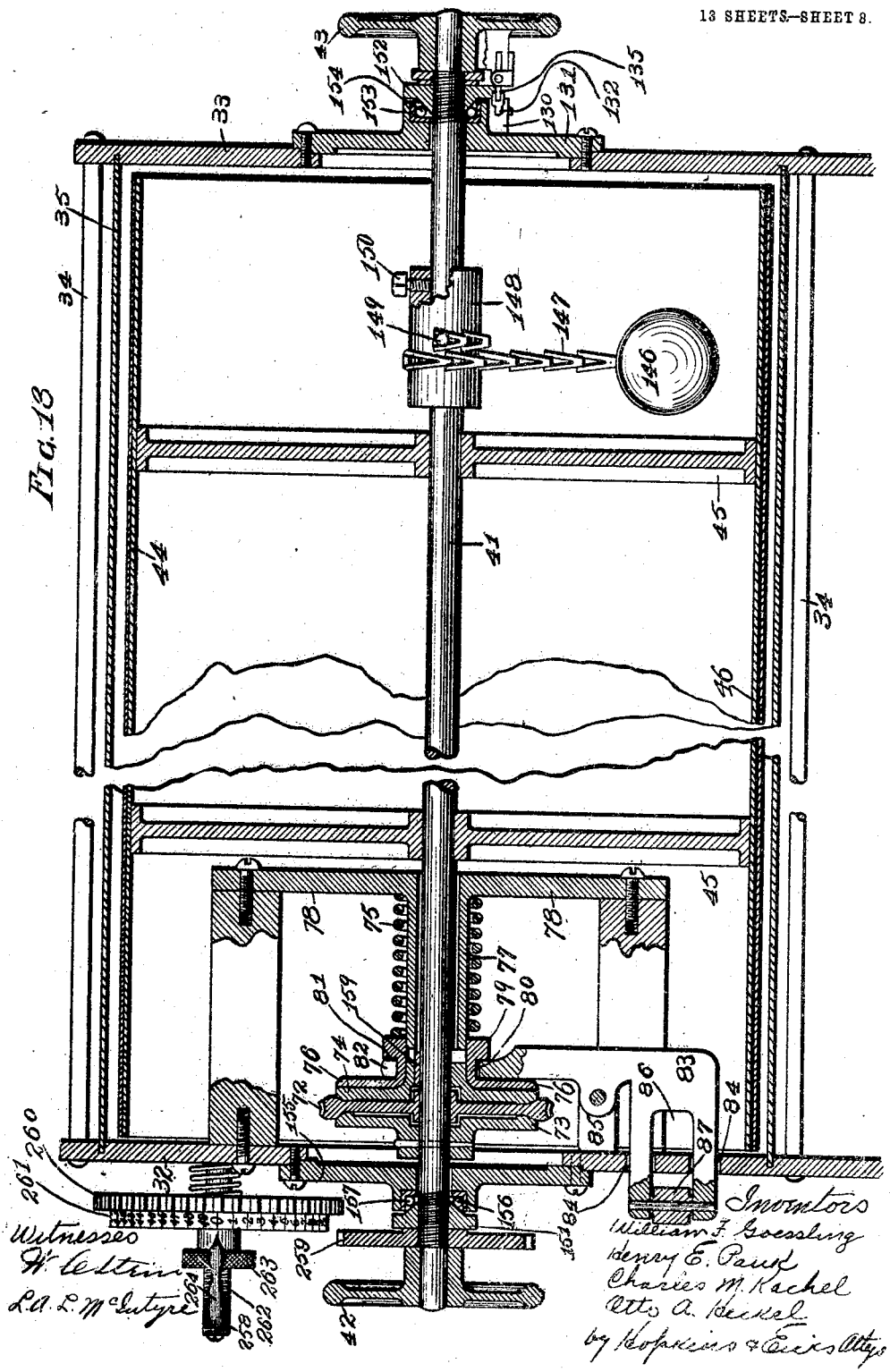

O. A. HECKEL, C. M. KACHEL, W. F. GOESSLING & H. E. PAUK.
CLOTH MEASURING AND REWINDING MACHINE.
APPLICATION FILED DEC. 30, 1909.
1,074,621.
Patented Oct. 7, 1913.
12 SHEETS—SHEET 9.
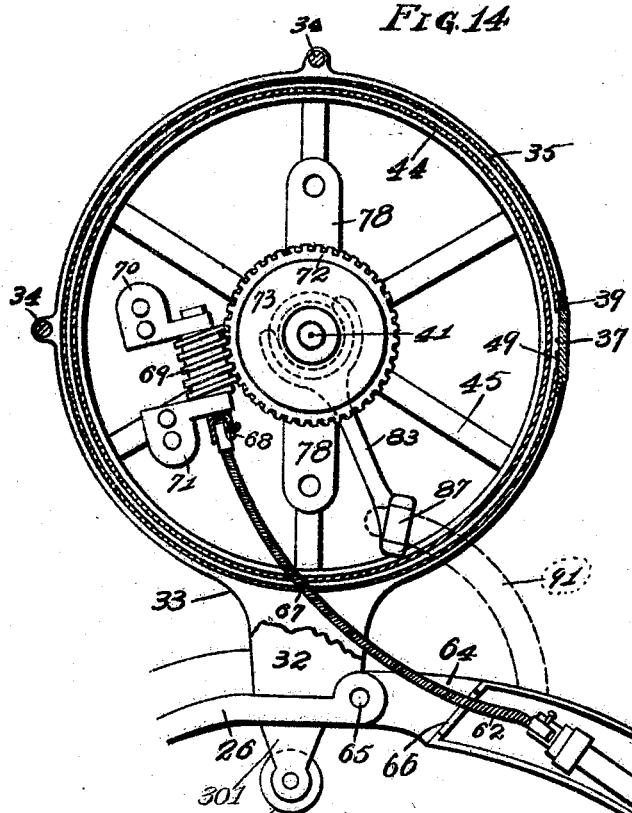
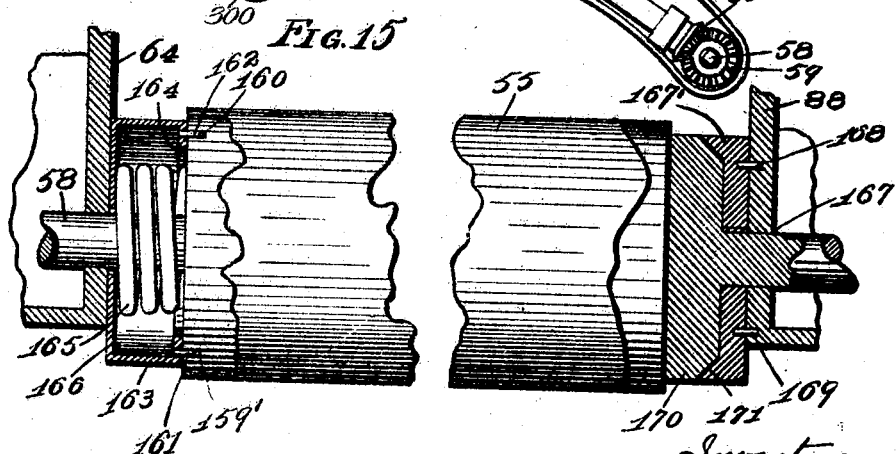

O. A. HECKEL, C. M. KACHEL, W. F. GOESSLING & H. E. PAUK.
CLOTH MEASURING AND REWINDING MACHINE.
APPLICATION FILED DEC. 30, 1909.
1,074,621.
Patented Oct. 7, 1913.
13 SHEETS—SHEET 10.
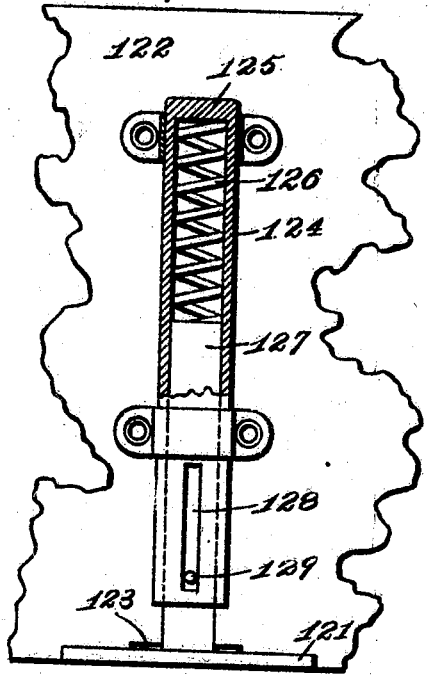
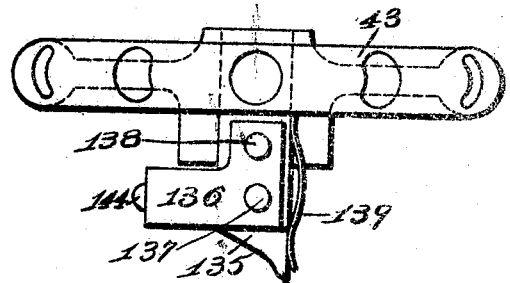
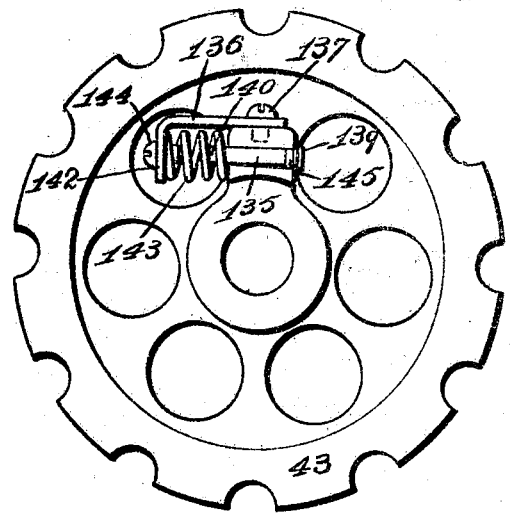
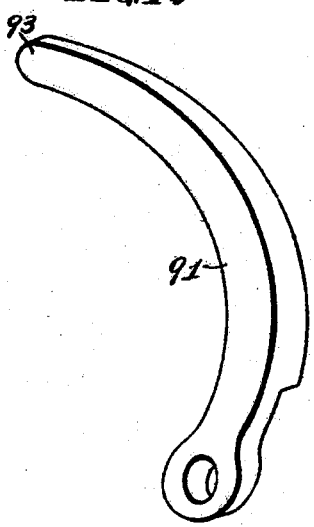
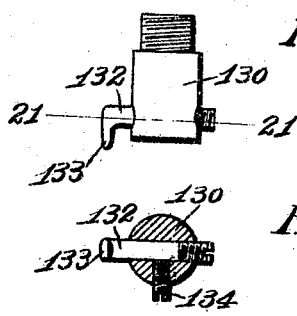
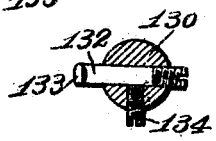
Witnesses
W. C. Stein
L. A. F. McIntyre
Inventors
William F. Goessling
Henry E. Pauk
Charles M. Kachel
Otto A. Heckel
by Hopkins & Eicks attys.

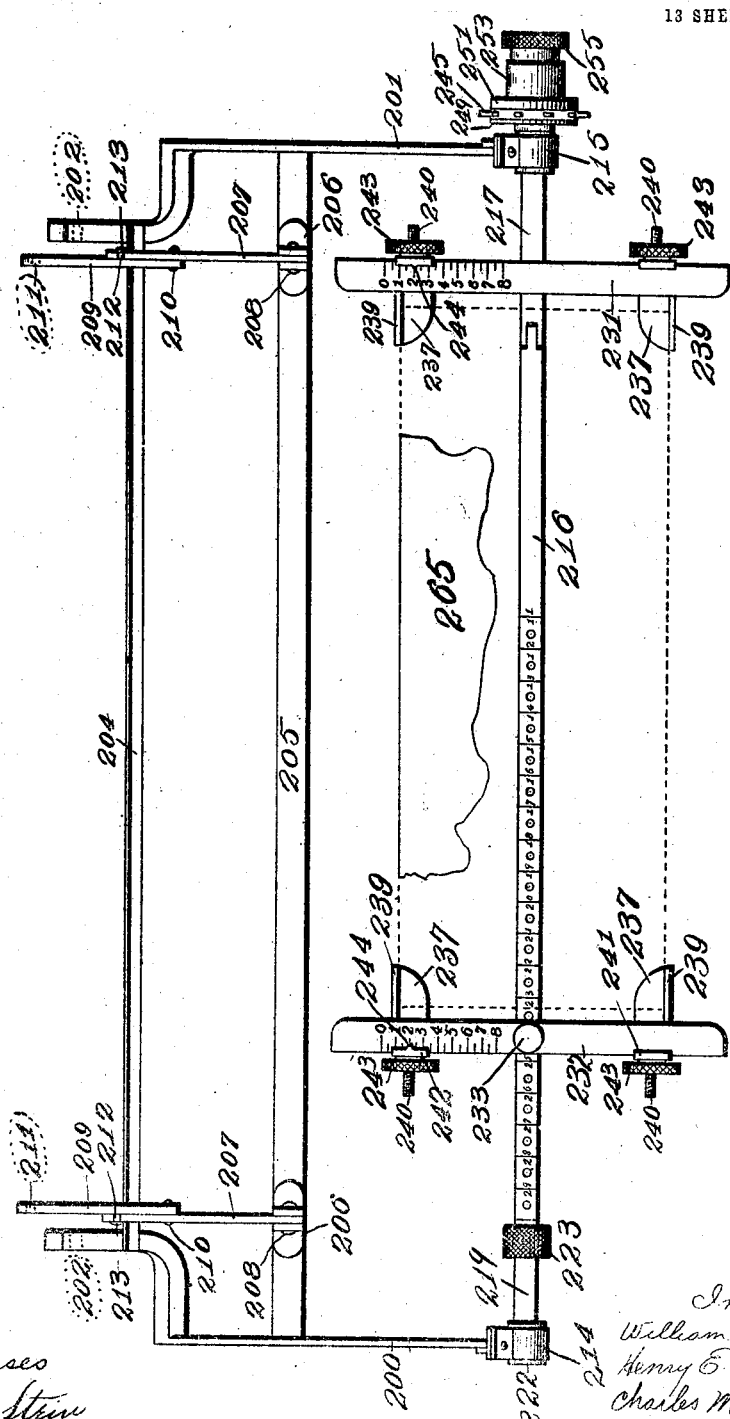

O. A. HECKEL, C. M. KACHEL, W. F. GOESSLING & H. E. PAUK.
CLOTH MEASURING AND REWINDING MACHINE.
APPLICATION FILED DEC. 30, 1909.

1,074,621.

Patented Oct. 7, 1913.
13 SHEETS—SHEET 12.

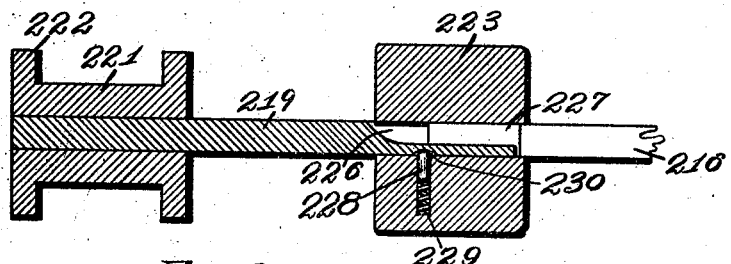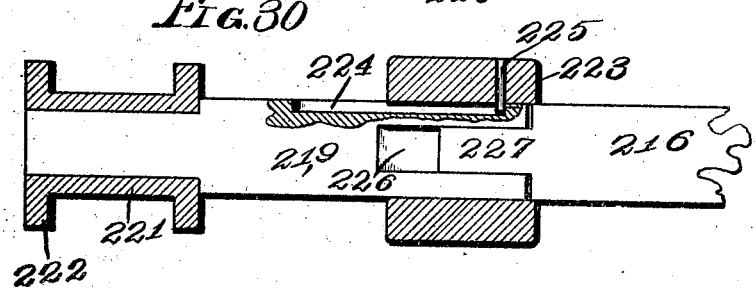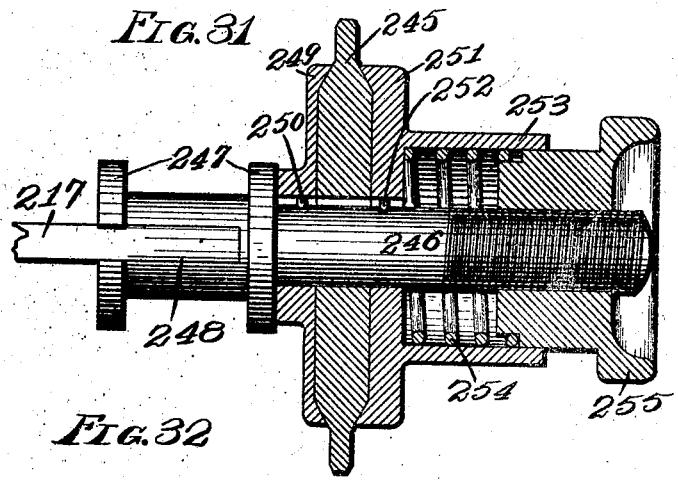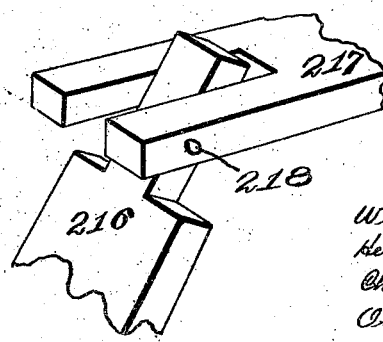

UNITED STATES PATENT OFFICE.

OTTO A. HECKEL, CHARLES M. KACHEL, WILLIAM F. GOESSLING, AND HENRY E. PAUK, OF ST. LOUIS, MISSOURI, ASSIGNORS TO CLOTHMETER MANUFACTURING COMPANY, A CORPORATION OF MISSOURI.

CLOTH MEASURING AND REWINDING MACHINE.

1,074,621.  Specification of Letters Patent.  Patented Oct. 7, 1913.

Application filed December 30, 1909. Serial No. 535,691.

*To all whom it may concern:*

Be it known that we, OTTO A. HECKEL, CHARLES M. KACHEL, WILLIAM F. GOESSLING, and HENRY E. PAUK, citizens of the United States, and residents of St. Louis, Missouri, have invented certain new and useful Improvements in Cloth Measuring and Rewinding Machines, of which the following is a specification.

Our invention relates to improvements in cloth measuring and re-winding machines, and relates more particularly to that type of said machines in which the computing drum is actuated by the unwinding of cloth from the bolt; our present invention being based upon our certain other invention for which application for United States Letters patent is now pending, Serial No. 522,003, filed October 11, 1909, the device of this present application being intended and adapted for use in connection with the device of the said former application.

Figure 25:
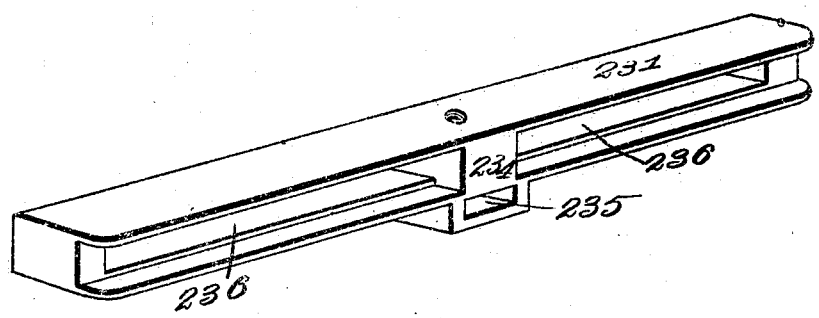
Figure 26:
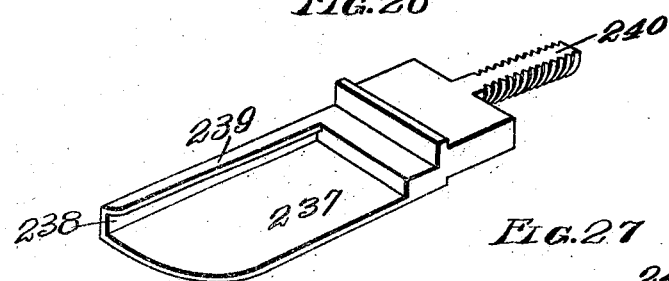
Figure 27:
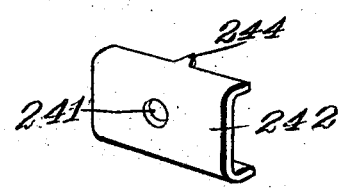
Figure 28:
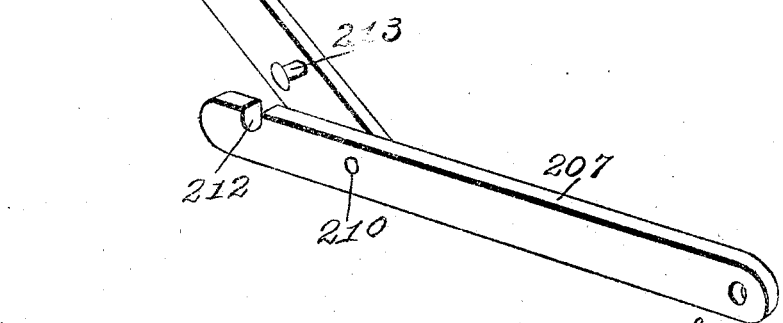

In the drawings—Figure 1 is a perspective view of a device embodying our invention. Fig. 2 is a side elevation of the same. Fig. 3 is an elevation of the opposite side of a device embodying our invention. Fig. 4 is a front elevation of the same. Figs. 5, 6 and 7 are views showing the lineal measurement scale (Fig. 6), the price totals, and scale of prices per yard, exhibited through the opening in the front of the computing drum, the illustration being taken when the drum is at rest and the views in the sequence of their numbers presenting a continuous and complete exhibit of numerals visible from the front of the machine when the machine is so at rest; the views being taken in the order of their numbers from left to right. Fig. 8 is a detail sectional view taken through the window in the housing of the computing drum, and through the periphery of the computing drum, taken along the line 8—8 of Fig. 4. Fig. 9 is a detail sectional view taken through the enlarged portion of the window in the housing of the computing drum, and through the periphery of the computing drum taken on the line 9—9 of Fig. 4. Fig. 10 is an enlarged perspective view of the longitudinal adjusting bar employed in the bolt-receptacle. Fig. 11 is a longitudinal vertical view of the same in section, showing the guide-boards in place. Fig. 12 is a bottom plan view of the exterior attachments upon the right end of the shaft carrying the computing drum. Fig. 13 is a longitudinal view in vertical midsection, taken through the computing drum, the central portion being broken away. Fig. 14 is an enlarged detail view of the flexible connection between the computing drum and the upper friction roller, indicating the resilient parts exposed by the removal of the left head of the housing containing the computing drum. Fig. 15 is an enlarged detail view of the end of the upper friction roller, showing the anti-slipping mechanism with which it is equipped. Fig. 16 is an enlarged detail view of the frictional lock with which the right guide-board is provided. Fig. 17 is a top plan view of the wheel mounted on the right end of the shaft carrying the computing drum. Fig. 18 is a rear elevation of said wheel and its dog mechanism. Fig. 19 is an enlarged perspective view of the arc-shaped wedge whereby the computing drum is thrown out of operative connection with the upper friction roller. Fig. 20 is a top plan view of the adjustable stop whereby the computing drum is adjusted. Fig. 21 is a vertical sectional view of the same taken along the line 21—21 of Fig. 20. Fig. 22, Sheet 7, is a plan view of the bell-crank lever 83. Fig. 23 is a similar view of the dog 135. Fig. 24 is a top plan view of the rewinding shaft and its attachments. Fig. 25 is an enlarged perspective view of one of the cross-bars employed on the re-winding shaft. Fig. 26 is a similar view of one of the dogs employed upon the cross-bars. Fig. 27 is a perspective view of one of the washers employed upon said dogs. Fig. 28 is an enlarged perspective view of one of the flexible arms whereby the re-winding attachment is secured in place upon the front of the cloth-measuring machine. Fig. 29 is a longitudinal mid-sectional view of the coupler employed in securing one end of the re-winding shaft. Fig. 30 is a top plan view of said coupler, showing the ends of the re-winding shaft seated in position. Fig. 31 is a side elevation of the driving end of the re-winding shaft, the attachments upon its extremity being shown in mid-section. Fig. 32 is an enlarged perspective view of a fragment of the rewinding shaft at the point where it is hinged upon itself.

As shown in the drawings, we employ a frame 25 comprising the end supports 26—26 connected together by transverse rods 27, and containing the housing 28 which forms the cloth receptacle 29; the rear wall 30 of the receptacle 29 is substantially vertical while the front wall 31 is inclined upwardly and rearwardly (see Figs. 1, 2 and 3). At its top the frame 25 supports the heads 32 and 33 connected to each other by means of rods 34. Between the heads 32 and 33, which are parallel and vertical, we provide a cylindrical housing 35 provided at its front with horizontal windows 36 and 37, separated from each other by means of the vertical window 38, all of said windows being surrounded by the casing 39, provided with the vertical strips 40 for the accommodation of the vertical window 38. Within the cylindrical housing 35 the shaft 41 is mounted, its ends extending through the heads 32 and 33 and its outer extremities being provided with hand-wheels 42 and 43.

The drum 44 is mounted upon the shaft 41 by means of arms 45. About its periphery, and preferably at the middle part thereof, the drum 44 is provided with a lineal measurement scale 46. In the construction illustrated in the drawings (see Fig. 6), the lineal measurement scale on the circumference of the drum represents 16 yards, commencing at 0 and making one complete revolution, each yard being divided into fractions as desired (see Fig. 6). About its periphery and at each side of the lineal measurement scale 46, the drum 44 is provided with total-price scales 47 and 48 reading from left to right and indicating the total price of a given length of cloth at a given price per lineal yard. Within the windows 36 and 37 we provide stationary price scales 49 (see Figs. 5, 6, 7 and 8) ranging, in the structure illustrated in the drawings, from 2¢ to $4.00, and indicating the price per yard. As the drawings illustrate, a drum having a lineal measurement scale 46 representing 16 yards, the total amounts in alinement with the zero line indicate the total value of 16 yards of cloth at the given price per yard indicated by the cost scale 49. Thus, reading upward from the fixed cost scale 49 to the corresponding numbers upon the total-price scale 47 (see Fig. 5), we find the total price of 16 yards of cloth at 2¢ per yard indicated as 32¢; the total price of 16 yards of cloth at 37½¢, indicated as $6.00, and the total price of 16 yards at 70¢ per yard as $11.20 (see Fig. 6). The next reading from the total-price scale is had to the right of the lineal measure scale 46 (see Fig. 6), where we find the price of 16 yards at 72½¢ per yard, indicated as $11.60, and reading further from the same scale (see Fig. 7,) the total price of 16 yards at $3.98 per yard is given as $63.68.

The revolution of the computing drum 44 is accomplished by means of the withdrawal of the cloth from its bolt and contained in the receptacle 29, over the bracket 50 carried at the front of the frame 25. In alinement with the bracket 50 we provide two parallel friction rollers 51 and 52 journaled in the bearings 53 and 54; the rollers 51 and 52 being in fixed position, and the upper friction roller 55 being adapted to have frictional contact with the upper faces of the rollers 51 and 52 (see Figs. 2 and 3). The upper frictional roller 55 is provided with the crank 56 having a handle 57, and the roller 55 is mounted upon the shaft 58. At its left extremity the shaft 58 is provided with the bevel gear 59, Fig. 14, intermeshing with the bevel gear 60 mounted upon the shaft 61. The shaft 61 at its upper extremity receives a flexible shaft 62, and its connecting mechanism, which is illustrated in the drawings as being at the left extremity of the shaft 58, is contained in a housing 63 carried by the lever arm 64 which is pivotally mounted upon the frame 25 at the point indicated by the numeral 65. The housing 63 is provided at its upper extremity with the opening 66 through which the flexible shaft 62 extends. The flexible shaft 62 enters the housing 35 through the opening 67 in its bottom (see Fig. 14) and extends upward to the point where it is fixed in the shaft 68 provided with the worm gear 69 and journaled in the brackets 70 and 71. The worm 69 intermeshes with the worm-wheel 72, which is loosely mounted upon the shaft 41. The outer face of the worm wheel 72 is normally in contact with the disk 73, Fig. 13, which is fixed upon the shaft 41. Upon the inner face of the worm-wheel 72 the disk 74, slidably mounted upon the shaft 41 by means of a key 159, and registering in size with the disk 73, is normally thrust outward by means of the coil spring 75, to effect a frictional engagement with the worm-wheel 72. The disk 74 is provided with a disk 76 journaled upon the tubular collar 77 whose inner end is secured by the vertical support 78. The coil spring 75 is mounted upon the collar 77, at its inner extremity, exerting pressure upon the flanged collar 79 with which the disk 76 is provided. The disk 76 is connected to the collar 79 by means of the annular web 80, thus forming the grooved depression 81 in which the yoke 82 (see Fig. 22) is loosely mounted, the yoke 82 being provided with a bell-crank lever 83, Fig. 13, whose lower arm extends outwardly through the opening 84 in the head 32. The head 32 is provided upon its inner face with the bracket 85 upon which the bell-crank lever 83 is pivotally mounted. The lower arm of the bell-crank lever 83 is provided with a horizontal slot 86 provided at its mouth with the vertical roller 87.

The upper friction roller 55 is journaled at its right extremity in the curved support 88, Fig. 3, whose formation corresponds to that of the bracket 64; and the inner ends of the support 88 and bracket 64 are pivotally mounted at the points indicated by the numerals 65 and 90, which points of pivotal support are in alinement. An arc-shaped tapering lever bar 91, Fig. 19, is pivotally mounted upon the outer face of the bracket 64 as indicated by the numeral 92, Fig. 2, its thickness tapering toward its upper terminal 93; and the bar 91 passes through the horizontal slot 86 in the lower arm of the bell-crank lever 83 (see Fig. 13).

By means of the construction thus described, when the upper friction roller 55 is thrown upwardly and out of engagement with the upper surfaces of the lower friction rollers 51 and 52, the lever 91 contacting with the outer face of the head 32 and with the roller 87, thrusts the lower arm of the bell-crank lever 83 outwardly, driving the yoke 82 inwardly, releasing the worm-wheel 72 so as to permit it to revolve freely upon the shaft 41, so interrupting the connection between the upper friction roller 55 and the worm-gear 69 through the flexible shaft 62. The operative connection between the computing drum 44 and the upper friction roller 55 being thus completely interrupted, is restored by the act of lowering the upper friction roller 55 into its active position, in contact with the faces of the lower friction rollers 51 and 52.

For the expeditious shifting of position of the friction roller 55 and its connections, and to the end of locking said friction roller in either of its two positions, operative or inoperative, we have provided a lever arm 94, Fig. 2, pivotally mounted upon the head 32 by the pin 95, and terminating at its free end in the handle 96. A connecting bar 97 is pivotally connected to the bracket 64 by the pin 98 and to the lever arm 94 by the rod 99. Upon the inner face of the lever arm 94 we provide a pronged fork 100 which is pivotally mounted upon the rod 99, and is provided with an outwardly projecting handle 101 normally held away from the lever arm 94 by means of the coil spring 102. The lower engaging hook 103 of the pronged fork 100 engages with the pin 104 when the upper friction roller 55 is in operative position. The upper hook 105 engages with the pin 106 when the upper friction roller 55 is in its elevated or inoperative position (see Fig. 2).

The lever arm 94 is connected to a corresponding lever arm 107 by the rod 99, the lever arm 107 being provided with the handle 108 and being connected to the support 88 by the bar 109, whose lower end is secured to the support 88 by means of the pin 110, its upper end being secured to the outer face of the lever arm 107 by the rod 99. The pronged fork 111 is also mounted on the lever arm 107 by means of the rod 99, and is provided with the outwardly projecting handle 112; normally held away from the lever arm 107 by means of the coil spring 113. The lower hook 114 of the pronged fork 111 engages with the pin 115 to lock the upper friction roller 55 in operative position; while the upper hook 116 of the lever arm 107 engages with the pin 117 to lock the upper friction roller 55 in its elevated or inoperative position.

In order to maintain the bolt of cloth which is being measured in alinement with the friction rollers 51, 52 and 55, we have provided the guide-board 118 mounted upon the inner and up-turned end 119 of the adjusting bar 120 (see Figs. 1, 2 and 10), the adjusting bar 120 being provided at its opposite extremity with the handle 121. Within the receptacle 29 we provide a fixed guide-board 122 provided with the slot 123 through which the longitudinal adjusting bar 120 passes. Upon the outer face of the fixed guide-board 122 we provide a vertically mounted tube 124, Fig. 16, closed at its upper end as indicated by the numeral 125, and containing a coiled spring 126 whose lower end operates against the plunger 127 to thrust the same downwardly and into frictional contact with the upper face of the longitudinal adjusting bar 120. The tube 124 is provided with a slot 128 through which a pin 129 extends in the plunger 127. The pin 129 may be raised to permit the inward or outward adjustment of the longitudinal adjusting bar 120.

To prevent the retrograde movement of the computing drum 44, we have provided the means illustrated in Figs. 13, 17 and 18. On the outer face of the head 33 is provided a screw plug 130, Figs. 13, 20 and 21, whose inner end is screwed into position in the face-plate 131 mounted upon the outer face of the head 33. The plug 130 is screw-threaded horizontally to receive the screw-stop 132 which is provided with an outwardly projecting flange 133 at its outer end. The plug 130 is screw-threaded to receive the set-screw 134 by which the screw-stop 132 may be locked in position (see Figs. 20 and 21). A spring dog 135, Figs. 12, 18 and 23, is mounted upon the plate 136 by means of the pin 137. The outer end of the plate 136 is secured to the hand wheel 43 by means of the pin 138. The dog 135 is normally kept in alinement with the axis of the hand wheel 43 by means of the flat spring 139. Said dog 135 is also provided with a lateral projecting lug 140 (see Fig. 23), and is pivotally mounted at its outer end by the pin 138 passing through the perforation 141. The plate 136 is bent over at its end to form the bracket 142, Fig. 18. A coiled spring 143 is mounted around the lug 140 and its opposite end is held within the bracket 142 by means of the screw 144, Fig. 12. The projecting point 145 of the dog 135 is adapted to engage with the projection 133 of the screw 132 hereinabove described.

By means of the adjustment of the screw 132, the computing drum 44 is set so that its zero (0) line appears midway the height of the windows 36, 37 and 38.

In order that the computing drum may automatically return to its initial position indicated in Figs. 5, 6 and 7, with the zero (0) line midway the height of the windows 36, 37 and 38, we have provided a weight 146, Fig. 13, suspended by a chain 147, the end of which chain 147 is attached to the collar 148 by means of the pin 149. The collar 148 is slidably and revolubly mounted upon the shaft 41 and is fixed in position by means of the set-screw 150. The weight 146 is so suspended, by employing a chain 147 of such length, that the weight 146 will be drawn upward into contact with the collar 148 by a single revolution of the computing drum 144. Where the drum 44 is revolved more than once, the weight 146 will be drawn upwardly and over the collar 148 and dropped into its original position. By means of this device, the shaft 41 carrying with it the drum 44 will return to its initial position whenever the operative connection between said computing drum 44 and the upper friction roller 55 is interrupted by the elevation of the lever arms 94 and 107, as hereinbefore described.

It is obvious that the mechanism described in the preceding paragraph must be so constructed as to be operative within the limits of approximately one-half the diameter of the drum, owing to the limitations of space and the other operative parts of the device. To this end we prefer to use a chain 147 whose length in proportion to the circumference of the collar 148 is such that with each complete revolution of the drum 44, the weight 146 will be carried over the collar and will immediately drop to its former position with its load upon the depending end of the chain 147. By reason of this proportioning the length of the chain to the circumference of the collar 148, the entire mechanism is contained within the limits of space afforded by the interior of the drum 44, and should the drum, in the operative use of the device, accomplish more than one revolution, and no matter how many revolutions more than one are thus accomplished, the weight 146 is always so positioned as to restore the drum 44 to its initial or zero (0) position, when the operative connection between the drum 44 and the upper friction roller 55 is interrupted, by passing through less than one complete revolution.

To insure the comparatively frictionless rotation of the drum 44, we have provided the shaft 41 with the conical collars 151 and 152. The face-plate 131 is provided with the annular recess 153 containing the ball-bearings 154. Similarly, the head 32 is provided with the face-plate 155 having the annular chamber 156 provided with ball-bearings 157.

The mode of operation of the device of our invention will be readily understood from the foregoing description. The bolt of cloth to be measured is deposited in the receptacle 29. The guide-board 118 is adjusted by means of the handle 121 on the longitudinal adjusting bar 120. The end of the cloth is drawn outwardly between the lower friction rollers 51 and 52 and the upper friction roller 55. The crank 56 is revolved by the handle 57 to draw the cloth outwardly, movement being simultaneously imparted to the computing drum 44 by means of the flexible shaft 62. The desired length of cloth having been measured, as indicated by observation through the vertical window 38, the total selling price of such length of cloth so measured is made visible by reference to the price scale 49 and upon which the price per yard will appear, while the total price of the piece of cloth measured will be found upon the scale 47, immediately above the figures indicating the price per yard. The cloth being cut by means of any suitable cutting instrument, said cutting instrument being guided by the groove 158 on the shelf or bracket 50, the upper friction roller 55 is thrown upward, releasing the end of the cloth and disconnecting the mechanism actuating the drum 44, which drum 44 is then restored by reason of the weight 146 to its zero (0) or initial position. The bolt of cloth is then removed from the receptacle 49.

The upper friction roller 55 as illustrated in Fig. 15 is provided with means to insure its frictional engagement with the inner face of the bracket 64. At one of its extremities the upper friction roller 55 is provided with slotted recesses 159' and 160 in which pins 161 and 162 are slidably mounted. The pins 161 and 162 project from the inner face of the cylindrical drum 163 which is mounted about the shaft 58. The inner face of the drum 163 is cut away as indicated by the numeral 164 to permit the inner end of the coiled spring 165 to exert its pressure upon the end of the friction roller 55, the outer end of the coiled spring 165 being held by the inner face of the outer head 166 of the drum 163. The curved support 88 is provided with the opening 167 through which the shaft 58 passes and upon the inner face of the curved support 88 is provided a flanged disk 167' secured to the inner face of the support 88 by means of pins 168 and 169, to secure the disk against rotation. The shaft 58 is provided with the integral circular collar 170 whose outer edges are beveled as indicated by the numeral 171 to register with the inner face of the disk 167', as shown in Fig. 15. The lateral pressure exerted by the coiled spring 165 thus prevents the accidental rotation of the upper friction roller 55, and guards against the accidental slipping of said roller 55.

When it is desired to use the machine of our invention for the purpose of invoicing or taking stock, and computing the total number of lineal yards remaining upon a bolt of cloth which has been partly used in the course of trade, such measurements are accomplished by unwinding the remainder of such bolt and rewinding it to form a new bolt. To this end we employ a frame-work consisting of two forwardly projecting bars 200—201, Figs. 24 and 1, which are recessed at their inner ends as indicated by the numeral 202, to engage with and be seated upon the lower of the transverse rods 27, which connect the end supports 26—26. The bars 200 and 201 are connected by means of a fixed transverse rod 204 near their inner extremities, and a similar rod 205 about midway their length; the rod 205 being provided with hinge seats 206—206. The bars 207—207 are mounted in the hinge seats 206 by means of pins 208—208. Near their inner extremities the bars 207—207 are connected to other bars 209—209 by means of pins 210—210; the inner ends of the bars 209 being provided with depressions 211, Fig. 28, to engage with the upper of the transverse rods 27. The bars 207 are provided with depressions 212 which are adapted to engage with pins 213 when the bars 207 and 209 are brought into alinement with each other.

By means of the structure thus described, the rewinding attachment is removably mounted upon the transverse rods 27—27. At their front ends the bars 200 and 201 are provided with journal-boxes 214 and 215 in which the rewinding shaft 216 is operated. The bar 217 is hinged to the rewinding shaft 216 at the point indicated by the numeral 218, Figs. 24 and 36. At its opposite end the shaft 216 is held by the coupler (see Figs. 29 and 30) consisting of the flat bar 219 whose outer extremity is held in the spool 221; the spool 221 being provided with flanges 222 to engage with the sides of the journal-boxes 214.

The knurled cylinder 223 is slidably mounted upon the flat bar 219; the bar 219 being provided with a slot 224, Fig. 30, upon one of its edges, and the cylinder 223 being provided with the inwardly projecting pin 225 extending into the slot 224 to limit the movement of the cylinder 223. At its inner end the flat bar 219 is slotted as indicated by the numeral 226 to receive the tongue 227 formed on the engaging end of the re-winding shaft 216, and the knurled cylinder 223 is adapted to slide over the tongue 227 to hold the same in position (see Figs. 29 and 30), the cylinder 223 being locked in position when in engagement with the tongue 227 by means of the spring-latch 228 mounted diametrically in the cylinder 223 and normally thrust inwardly by means of the coiled spring 229, the point of the latch 228 engaging with a depression 230 formed in the face of the flat bar 219.

Upon the shaft 216 we employ cross-bars 231 and 232; the cross-bar 231 being rigidly mounted upon the bar 217 (see Fig. 24), while the cross-bar 232 is slidably mounted upon the shaft 216, being secured in place by means of the thumb-screw 233. The form of these cross-bars is illustrated in Fig. 25. They are provided with a solid central portion 234 upon which is formed a transversely slotted ear 235 by means of which the cross-bar is mounted upon the shaft 216 or bar 217. They are provided at either side of the solid portion 234 with the slotted apertures 236—236 in which the dogs 237 are mounted. The dogs 237 have inwardly projecting ears 238 provided with flanges 239, to engage one corner of the board 265 upon which the bolt is to be wound; they also have an outwardly projecting screw 240 passing through the opening 241 in the washer 242, and locked in position by means of thumb-screws 243; the washers 242 being provided with index points 244 registering with the scales upon the cross-bars 231 and 232 (see Fig. 24), to insure the equal balancing of the board or other bolt base upon the rewinding shaft 216.

The shaft 216 is driven by the sprocket 245, Figs. 11, 24 and 31, which is loosely mounted upon the axle 246. The inner end of the axle 246 terminates in collars 247—247 which are adapted to hold the axle 246 in place within the journal-box 215. The axle 246 is adapted, as indicated by the numeral 248, to receive the outer end of the bar 217.

Frictional engagement between the sprocket 245 and the shaft 246 is provided as follows: A friction disk 249, Fig. 31, is held from turning upon the shaft 246 by means of the pin 250 carried by the shaft, and the friction disk 251 is similarly held upon the shaft 246 and at the opposite side of the sprocket 245 by means of the pin 252. The friction wheel 251 is made integral with a socket 253 whose interior is concentric with the shaft 246, and serves as a housing for the coiled spring 254. The outer end of the shaft 246 is screw-threaded to receive the knurled screw cap 255, which is screwed inwardly or outwardly, its inner face contacting with the coiled spring 254 to produce the desired amount of friction between the friction wheel 251 and the face of the sprocket wheel 245.

The shaft 58 is provided at one end with a sprocket wheel 256, Figs. 3 and 1, and movement is imparted to the sprocket wheel 245 by means of the chain 257. When the crank handle is operated, by this operation the shaft 246 together with the board carried by the same, over which the cloth is wound is placed in operation, as the cloth winding upon the board becomes increased in length owing to every successive revolution, the sprocket wheel 245 is permitted to operate freely upon the shaft by means of the friction mechanism holding the same and only permitting the board to rotate when the cloth is passed freely from beneath the friction rollers. The frictional tension on the sprocket wheel 245 is regulated by the cap screw 255 upon the spring 254. The head 32 is provided with an outwardly projecting horizontal pin 258 which is parallel to the shaft 41. The shaft 41 is provided with a gear wheel 259 which is adapted to intermesh with the gear wheel 260 which is loosely mounted upon the pin 258. The gear 260 is provided with a concentric outwardly projecting scaled collar 261, as illustrated in Fig. 13, and is scaled to indicate 50 yards. The teeth of the gear wheel 259 and 260 are of such number and dimensions that the scale 261 will register any desired number of lineal yards in excess of the number of lineal yards indicated by one complete revolution of the drum 44 which indicates sixteen yards. The pin 258 is screw-threaded as indicated by the numeral 262 to receive the knurled collar 263 which is for the purpose of disengaging the wheel 260 from the wheel 259 when the same is not to be used, by this operation the spring on the pin 258 is compressed and its tendency is to keep the wheel 260 in close contact with the collar at all times.

When the re-winding device is not employed, the collar 263 will be moved inwardly (see Fig. 13), so that the teeth of the gear wheel 260 will be thrown out of engagement with the teeth of the gear wheel 259. When the re-winding device is to be employed, the collar 263 will be screwed outwardly to throw the teeth of said gear wheels 259 and 260 into engagement. The pin 258 is provided with a fixed index pointer 264 which points to the number of lineal yards which have been rewound, upon the circular scale 261.

When the bolt of cloth being re-wound has been entirely wound on the new bolt by means of the re-winding shaft 216, the cylinder 223 is drawn outwardly to release the coil spring 227, Fig. 30, the shaft 216 is flexed upon its hinged point 218, the cross-bar 232 is withdrawn from the shaft 216, and the wound bolt of cloth is thus released and may be drawn off the shaft 216.

In order to maintain the same character of fold in the rewinding of a bolt of double-width cloth, in which the cloth is folded over upon itself longitudinally, we have found it necessary to employ the roller 300, Figs. 1, 2 and 3, suspended from the hangers 301 so that the cloth may be run from the bolt, for the purpose of rewinding over the said roller 300 before it is passed through the friction rollers (see Figs. 1, 2 and 3).

The operation of our invention is as follows: A bolt of cloth is placed within the body of the machine, its free end being passed above the rollers 51 and 52 and below the friction roller 55, the crank handle 57 is operated and, by the frictional connection of the rollers with the cloth, will advance the cloth between the rollers and during the revolution of the friction roller the flexible shaft 62 is rotated by means of its connection 61 with the bevel gear 59 of the roller operating the worm 69, which in turn meshes with and operates the worm wheel 73, the worm wheel 73 being connected to the shaft 41, the drum which is mounted thereon is simultaneously operated, the scale on the periphery of the drum being observed through the windows formed on the drum casing or housing. After the required number of yards of cloth have been passed through the machine and accurately measured and the amount indicated on the drum, the operator severs the same from the bolt by passing the shears into the notch or groove 158 formed in the table 50. The drum is held upon the shaft 41 by frictional contact and the same is permitted to revolve with the shaft when the frictional roller is down and in contact with the cloth. When raising the roller and the frame by which it is carried in the position as shown by dotted lines in Fig. 3 the bar 91 carried by the frame being tapered in form (see Fig. 19) and located and operating between the side of the housing and the roller 87 presses the roller outwardly simultaneously operating the bell crank lever 83 which disengages the frictional contact which will then permit the drum to automatically revolve to its original position or starting point by the action of the weight 146. In measuring an entire bolt of cloth to ascertain the number of yards therein the operator, by manipulating the knurled collar 263 places the gear wheel 260 in mesh with the gear wheel 259 and it is so arranged before said wheels are brought into mesh by placing the same in a position so that the pointer 264 is in alinement with the 0, or starting point on the scaled collar. The construction of this device is such that when the cloth is being passed through the machine and the drum has made one complete revolution, indicating sixteen yards, 16 on the scaled collar will be in alinement with the arrow. The drum while continuing on a second revolution will show on the scaled collar 32 yards and so on.

The rewinding device is used together with the scaled collar just described and while the cloth is being advanced through the machine and measured, the rewinding device is placing the cloth in the form of a bolt.

Having thus fully described our invention, what we claim as new and desire to have secured to us by the grant of Letters Patent, is:

1. In a cloth-measuring and re-winding machine, the combination of a receptacle adapted to receive and hold a bolt of cloth to be measured and unwound; two lower friction rollers mounted parallel with said receptacle; an upper friction roller adapted to engage with the upper faces of said lower friction rollers; a crank whereby said upper friction roller is actuated; a re-winding shaft actuated simultaneously with the friction roller; a bracket supporting said re-winding shaft; a scaled collar, and actuating means interposed between the friction roller and said scaled collar, substantially as described.

2. In a device of the class described, a frame; means carried by the frame for holding a bolt of cloth in revoluble position; two lower horizontal and parallel friction rollers mounted parallel with the bolt; an upper friction roller pivotally carried by the frame and having operative frictional contact with the upper faces of the lower rollers; a scaled collar revolubly mounted on the frame; means adapted to convey rotative movement from the upper friction roller to said scaled collar; a re-winding shaft carried by the frame parallel with the rollers; and a friction means whereby the re-winding shaft is revolved simultaneously with the upper friction roller, substantially as described.

3. In a cloth-measuring and re-winding machine, the combination of a receptacle adapted to receive and hold a bolt of cloth to be measured and unwound; two lower friction rollers mounted parallel with said receptacle; an upper friction roller adapted to engage with the upper faces of said lower friction rollers; a crank whereby said upper friction roller is actuated; a re-winding shaft actuated by a chain connection with said upper friction roller; a scaled collar; actuating means interposed between the friction rollers and said scaled collar; the re-winding shaft being provided with adjustable means for holding a board upon which the cloth is to be re-wound, substantially as described.

4. In a device of the class described, a frame; means carried by the frame for holding a bolt of cloth in revoluble position; two lower horizontal and parallel friction rollers mounted parallel with the bolt; an upper friction roller pivotally carried by the frame and having operative frictional contact with the upper faces of the lower rollers; a scaled collar revolubly mounted on the frame; means adapted to convey rotative movement from the upper friction roller to said scaled collar; a re-winding shaft detachably carried by the frame and parallel with the rollers; means whereby the re-winding shaft is revolved simultaneously with the friction rollers; the re-winding shaft being provided with adjustable and friction means for holding and operating a board upon which the cloth is to be re-wound, substantially as described.

5. In a cloth-measuring and re-winding machine, the combination of a frame; a cloth receptacle carried by said frame; a price-computing drum revolubly mounted in said frame, said drum having means whereby it is restored to its initial zero upon the completion of each measuring operation; means whereby said price-computing drum is revolved by the withdrawal of cloth from said receptacle; a secondary frame detachably mounted upon the first-named frame; a re-winding shaft carried by said secondary frame; means whereby said re-winding shaft is revolved by the withdrawal of cloth from said receptacle; a measurement wheel provided with a scale and carried by the first-named frame; and means for detachably connecting said measurement wheel with said price-computing drum, whereby said wheel is revolved by the revolution of said drum, substantially as described.

6. In a cloth-measuring and re-winding machine, the combination of a receptacle adapted to receive and hold a bolt of cloth to be measured and unwound; a horizontal roller suspended above said receptacle over which the cloth operates; two lower friction rollers mounted parallel with said receptacle; an upper friction roller adapted to engage with the upper faces of said lower friction rollers; a crank whereby said upper friction roller is actuated; a re-winding shaft detachably connected to the frame and actuated simultaneously with the friction rollers; a scaled collar, and actuating means interposed between the upper friction roller and said scaled collar, substantially as described.

7. In a cloth measuring and rewinding machine the combination of a receptacle adapted to receive and hold a bolt of cloth, a plurality of friction rollers mounted on the receptacle parallel with the bolt of cloth, an adjustable rewinding device for supporting the body on which the cloth is wound after passing from the friction rollers detachably connected to the receptacle, a friction device located on the rewinding shaft for operating the body and means for imparting motion to the same, substantially as specified.

8. In a cloth measuring and rewinding machine the combination of a receptacle arranged for the reception of a bolt of cloth, a frame detachably connected to the receptacle, a plurality of friction rollers located on the receptacle and between which the cloth is passed, a crank for operating the friction rollers, a shaft supported on the frame, a pair of bars located on the shaft between which the body, for the reception of the cloth is supported, a sprocket wheel mounted on the shaft, a friction means located on the shaft contacting with the sprocket wheel through which medium the shaft is rotated and a chain connecting the shaft with the friction rollers by which motion is imparted to the body for rewinding the cloth simultaneously with the operation of the friction rollers, substantially as specified.

9. In a cloth measuring and rewinding machine the combination of a receptacle in which is mounted a bolt of cloth, a plurality of friction rollers supported on the receptacle and located parallel with the bolt of cloth, a frame detachably connected to the receptacle, a hinged shaft supported on the frame, a portion of said shaft having graduations, means for supporting the free end of the shaft, a cross bar rigidly located on the shaft, a similar bar slidably mounted on said shaft, dogs mounted upon said bars for the reception of a body on which the cloth is to be rewound, a sprocket wheel mounted on the shaft, a friction mechanism carried on the shaft and contacting with the sprocket wheel and a chain connecting the sprocket wheel with the friction rollers and operated simultaneously, substantially as specified.

In testimony whereof, we have signed our names to this specification, in presence of two subscribing witnesses.

OTTO A. HECKEL.
CHARLES M. KACHEL.
WILLIAM F. GOESSLING.
HENRY E. PAUL.

Witnesses:
   JAMES L. HOPKINS,
   L. A. L. McINTYRE.